United States Patent
Palani et al.

(10) Patent No.: US 10,921,478 B2
(45) Date of Patent: Feb. 16, 2021

(54) METHOD AND TRANSDUCER FOR ACOUSTIC LOGGING

(71) Applicant: Halliburton Energy Services, Inc., Houston, TX (US)

(72) Inventors: Vinodh Kumar Palani, Singapore (SG); Jing Jin, Singapore (SG); Chin Wee Lim, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 375 days.

(21) Appl. No.: 15/745,799

(22) PCT Filed: Oct. 14, 2016

(86) PCT No.: PCT/US2016/057010
§ 371 (c)(1),
(2) Date: Jan. 18, 2018

(87) PCT Pub. No.: WO2018/071038
PCT Pub. Date: Apr. 19, 2018

(65) Prior Publication Data
US 2019/0277994 A1    Sep. 12, 2019

(51) Int. Cl.
*G01V 1/52* (2006.01)
*G01V 1/02* (2006.01)
(Continued)

(52) U.S. Cl.
CPC .............. *G01V 1/52* (2013.01); *E21B 47/085* (2020.05); *G01V 1/159* (2013.01); *G01V 1/40* (2013.01)

(58) Field of Classification Search
CPC . G01V 1/52; G01V 1/159; G01V 1/40; E21B 47/082
See application file for complete search history.

(56) References Cited

U.S. PATENT DOCUMENTS 4,628,223 A * 12/1986 Takeuchi ............... G01H 11/08
310/334
4,692,654 A * 9/1987 Umemura ............. B06B 1/0622
310/327
(Continued)

FOREIGN PATENT DOCUMENTS

JP    2004198283 A    7/2004

OTHER PUBLICATIONS

PCT International Search Report and Written Opinion dated Jul. 12, 2017, issued in corresponding application No. PCT/US2016/057010 filed on Oct. 14, 2016, 14 pgs.
(Continued)

*Primary Examiner* — Jeremy A Luks
(74) *Attorney, Agent, or Firm* — Chamberlain Hrdlicka

(57) ABSTRACT

A transducer, method, and downhole tool for acoustic logging. The acoustic transducer comprises a piezoelectric material comprising a body and grooves formed on the body. The grooves comprise a first groove that intersects with a second groove on the body. The method of acoustic logging a wall comprises transmitting an acoustic pulse at the wall using the acoustic transducer. The method also comprises generating a signal indicative of a reflection of the pulse using the acoustic transducer; and determining an acoustic parameter based on the signal using a processor. The acoustic logging tool is locatable in a wellbore intersecting a subterranean earth formation. The acoustic logging tool comprises the acoustic transducer and a processor configured to determine an acoustic parameter based on a signal generated by the acoustic transducer, the signal being indicative of the acoustic wave.

20 Claims, 6 Drawing Sheets

(51) Int. Cl.
*E21B 47/085* (2012.01)
*G01V 1/40* (2006.01)

(56) References Cited

U.S. PATENT DOCUMENTS

| | | | | |
|---|---|---|---|---|
| 4,890,268 | A * | 12/1989 | Smith | B06B 1/0629 367/138 |
| 5,044,462 | A | 9/1991 | Maki, Jr. | |
| 5,130,950 | A | 7/1992 | Orban et al. | |
| 5,987,385 | A | 11/1999 | Varsamis et al. | |
| 6,310,426 | B1 | 10/2001 | Birchak et al. | |
| 6,466,513 | B1 | 10/2002 | Pabon et al. | |
| 6,467,140 | B2 * | 10/2002 | Gururaja | B06B 1/0622 29/25.35 |
| 6,607,491 | B2 * | 8/2003 | Sato | G10K 11/02 310/311 |
| 6,894,425 | B1 * | 5/2005 | Solomon | B06B 1/0629 310/334 |
| 6,995,500 | B2 | 2/2006 | Yogeswaren | |
| 7,075,215 | B2 * | 7/2006 | Yogeswaren | G01V 1/186 310/334 |
| 7,460,435 | B2 * | 12/2008 | Garcia-Osuna | G01V 1/52 367/25 |
| 9,079,221 | B2 * | 7/2015 | Goodman | B06B 1/0625 |
| 9,321,082 | B2 * | 4/2016 | Ona | B06B 1/0629 |
| 9,555,444 | B2 * | 1/2017 | Goodman | G10K 11/02 |
| 2005/0000279 | A1 | 1/2005 | Yogeswaren | |
| 2006/0185430 | A1 | 8/2006 | Yogeswaren | |
| 2007/0204697 | A1 | 9/2007 | Watanabe et al. | |
| 2008/0098816 | A1 * | 5/2008 | Yamashita | B06B 1/0629 73/596 |
| 2009/0213690 | A1 * | 8/2009 | Steinsiek | G01V 1/52 367/35 |
| 2013/0327139 | A1 | 12/2013 | Goodman et al. | |

OTHER PUBLICATIONS

Anonymous, Properties of Water-based Muds, Properties of Water-based Muds, Aug. 1, 2007, 4 page—URL: https://www.nationaldriller.com/articles/87028-properties-of-waterbased-muds, XP055684713, National Driller.

Ekeom Didace et al, Coupled finite-element wave number decomposition method for the modeling of piezoelectric transducers radiating in fluid-filled boreholes, Coupled finite-element wave number decomposition method for the modeling of piezoelectric transducers, Nov. 1, 1998, pp. 2779-2789,XP012000630, vol. 104, No. 5, The Journal of the Acoustical Society of America, New York, NY, US.

* cited by examiner

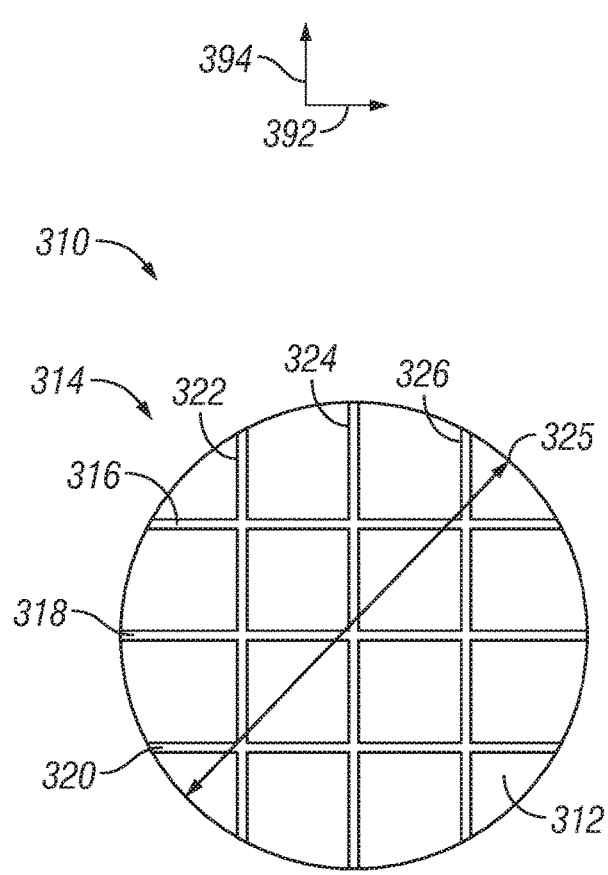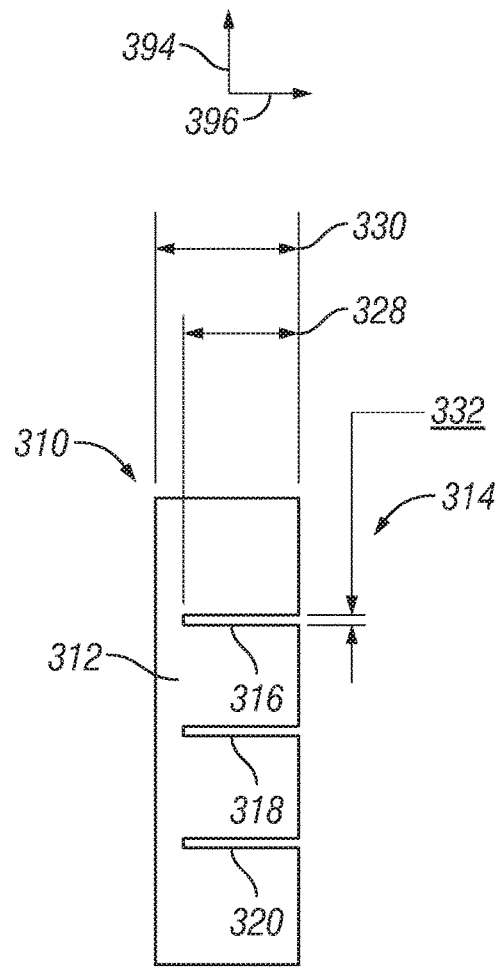
FIG. 4
FIG. 5

METHOD AND TRANSDUCER FOR ACOUSTIC LOGGING

CONTEXT

This section is intended to provide relevant contextual information to facilitate a better understanding of the various aspects of the described embodiments. Accordingly, it should be understood that these statements are to be read in this light and not as admissions of prior art.

Petroleum drilling and production operations use a great deal of information relating to underground conditions. Such information may include characteristics of the earth formations traversed by a wellbore, in addition to data on the size and configuration of the wellbore itself. Among the characteristics of the earth formation of interest to drillers may be the porosity and density of the rock or strata surrounding the wellbore. However, the processes often employed to measure these characteristics may be subject to important errors unless information on the wellbore size and configuration is also taken into account in their determination.

The collection of information on downhole conditions, referred to as "logging," may be accomplished in several ways. A sonde, or probing tool, often having a number of detecting and sensing devices for measuring various downhole parameters, may be lowered into the wellbore on the end of a cable, or wireline. The cable serves to control the position of the sonde and conveys information collected by the detectors and sensors to the surface where the data can be evaluated. Such wireline techniques may be used for measuring the caliper of a wellbore by incorporating mechanical calipers in a sonde. The calipers extend out from the sonde and contact the wall of the wellbore to measure its dimensions. A wireline sonde may also include an acoustic device for measuring the caliper of the wellbore.

The collection of data on downhole conditions can also occur during the drilling process. In addition to information on weight on bit, torque on bit, and direction of drilling, such information includes the size and configuration of the wellbore, the position of the drilling assembly in the wellbore, and the movement of the drill bit and the drill pipe in the hole. By collecting and processing such information during the drilling process, the driller can modify or correct key parameters of the operation to optimize drilling performance. The evaluation of physical properties, including pressure temperature and wellbore trajectory in a three-dimensional space, while extending the wellbore during the drilling operation is referred to as "measurement while drilling" (MWD). Similar techniques, involving the measurement of formation properties while extending the wellbore through the use of tools integrated into a bottomhole assembly are referred to as "logging while drilling" (LWD). While distinctions between these types of data collection may exist, the terms MWD and LWD are used interchangeably, and the term LWD, as used throughout the present description, should be understood to include both the collection of formation and wellbore information, as well as data on movement of the drilling assembly.

In LWD techniques, detecting and sensing devices are positioned on a downhole tool, or "bottom hole assembly" (BHA), above the drill bit. The configuration of the tool may vary depending upon the data being collected, but such tools may include devices for determining the neutron porosity of earth formations, employing a nuclear source housed in the tool. To determine the density of such formations, the tool may include devices that emit energy, such as gamma rays, to the formation surrounding the tool, and receive and detect some part of the energy reflected by the formation. Acoustic devices may also be included in the tool to collect information on the size, or caliper, of the hole as well as on standoff. As used herein, the standoff is the distance between the external surface of a logging tool and the wellbore wall.

Accurate caliper and standoff measurements collected in LWD operations may be important for a number of reasons. Because the density and porosity measurements are used to calculate characteristics of the earth formation based on assumptions about the size and configuration of the wellbore, the caliper and standoff measurements collected by acoustic devices are useful in correcting the density and porosity measurements where the actual wellbore conditions differ from those assumed in the calculations. Thus, accurate caliper and standoff measurements help in obtaining and interpreting reliable density and porosity data. In addition, knowing the caliper of the wellbore allows the driller to estimate the amount of cement required to fill the annular volume between the casing and the formation upon completion of the well. Also, such information can permit the driller to interpret how the drill bit or drillpipe is behaving during drilling. Because unusual movements of the drillpipe, such as whirling, sticking, and lateral bouncing, can have a very detrimental effect on the drill bit and drillpipe, this information can be extremely useful to the driller in mitigating tool wear and associated operational costs.

DESCRIPTION OF THE DRAWINGS

For a detailed description of the embodiments, reference will now be made to the accompanying drawings in which:

FIGS. 4 and 5 show cross-section views of the piezoelectric material of FIG. 3, in accordance with one or more embodiments;

DETAILED DESCRIPTION

Figure 1:
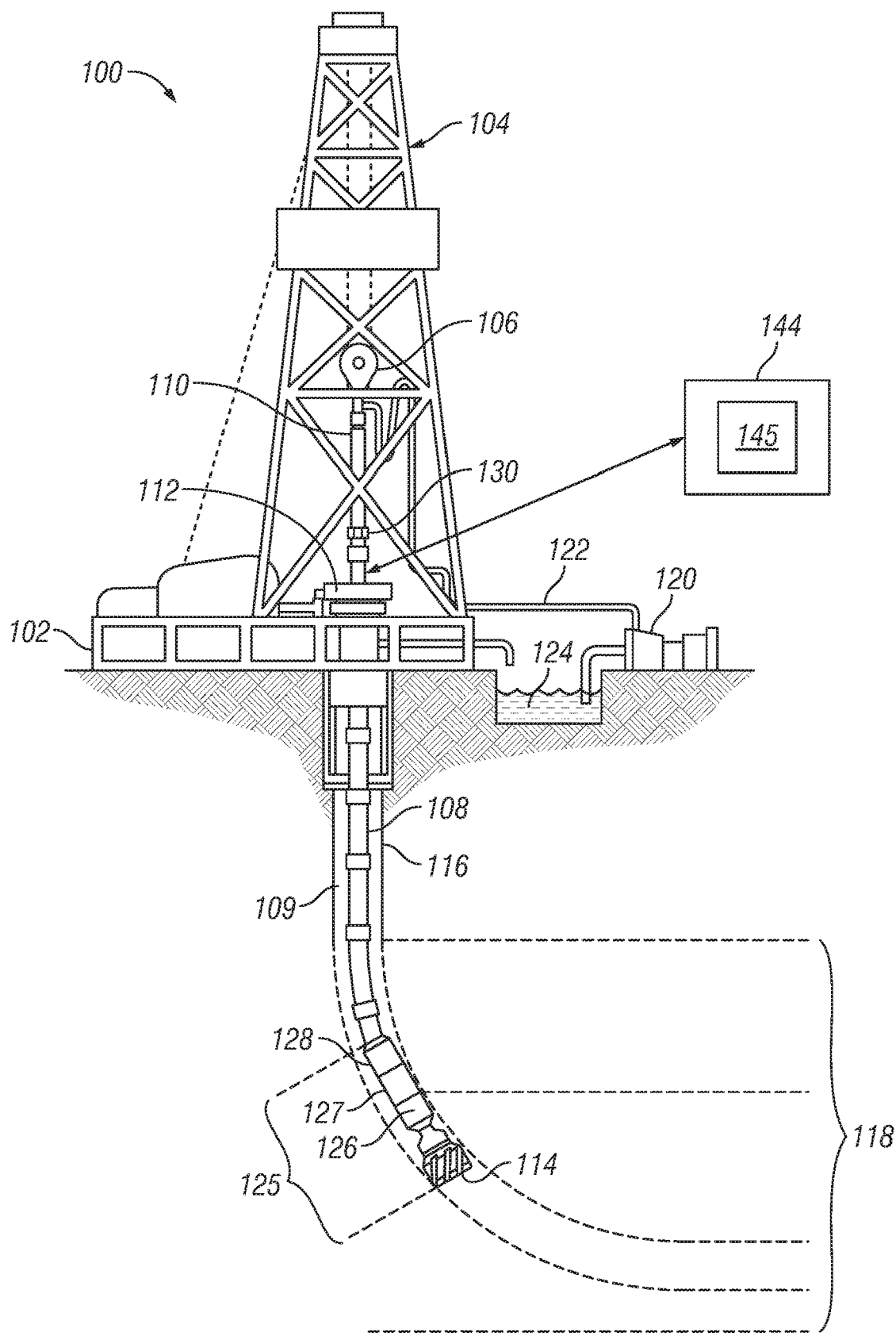
FIG. 1 shows a schematic view of a drilling operation employing a system to determine the standoff in a wellbore, according to one or more embodiments.

FIG. 1 shows a schematic view of a drilling operation employing a system 100 for acoustic logging in a wellbore 116, according to one or more embodiments. As shown, a drilling platform 102 supports a derrick 104 having a traveling block 106 for raising and lowering a drill string 108. A drill string kelly 110 supports the rest of the drill string 108 as it is lowered through a rotary table 112. The rotary table 112 rotates the drill string 108, thereby turning a drill bit 114. As the drill bit 114 rotates, it creates a wellbore 116 that passes through various subterranean earth formations 118. A pump 120 circulates drilling fluid through a feed pipe 122 to the kelly 110, downhole through the interior of the drill string 108, through orifices in the drill bit 114, back to the surface via an annulus 109 around the drill string 108, and into a retention pit 124. The drilling fluid transports cuttings from the wellbore 116 into the pit 124 and aids in maintaining the integrity of the wellbore 116.

A bottomhole assembly 125 is connected along the drill string 108 and includes drill collars 126, a downhole tool 127, and the drill bit 114. The drill collars 126 are thick-walled steel pipe sections that provide weight and rigidity for the drilling process. The downhole tool 127 (which may be built into one of the drill collars) may collect measurements relating to various wellbore and formation properties as well as the position of the bit 114 and various other drilling conditions as the bit 114 extends the wellbore 116 through the formations 118. For example, the downhole tool 127 includes an acoustic logging tool 128 to measure the standoff of the wellbore 116, in accordance with one or more embodiments.

The downhole tool 127 may include a device for measuring formation resistivity, a gamma ray device for measuring formation gamma ray intensity, devices for measuring the inclination and azimuth of the tool string 108, pressure sensors for measuring drilling fluid pressure, temperature sensors for measuring wellbore temperature, etc. The downhole tool 127 may also include a telemetry device that receives data provided by the various sensors of the bottomhole assembly 125 (e.g., the acoustic logging tool 128), and transmits the data to a surface control unit 144. Data may also be provided by the surface control unit 144, received by the telemetry device, and transmitted to the sensors (e.g., the acoustic logging tool 128) of the bottomhole assembly 125. The surface control unit 144 collects measurements from the bottomhole assembly 125, and includes a computer system 145 for processing and storing the measurements gathered by the sensors. Among other things, the computer system 145 may include a processor and a non-transitory machine-readable medium (e.g., ROM, EPROM, EEPROM, flash memory, RAM, a hard drive, a solid state disk, an optical disk, or a combination thereof) capable of executing instructions to perform such tasks. In addition to collecting and processing measurements, the computer system 145 may be capable of controlling the downhole tool 127. The surface control unit 144 may further include a user interface (not shown) which displays the measurements, for example, a monitor or printer.

Figure 2:
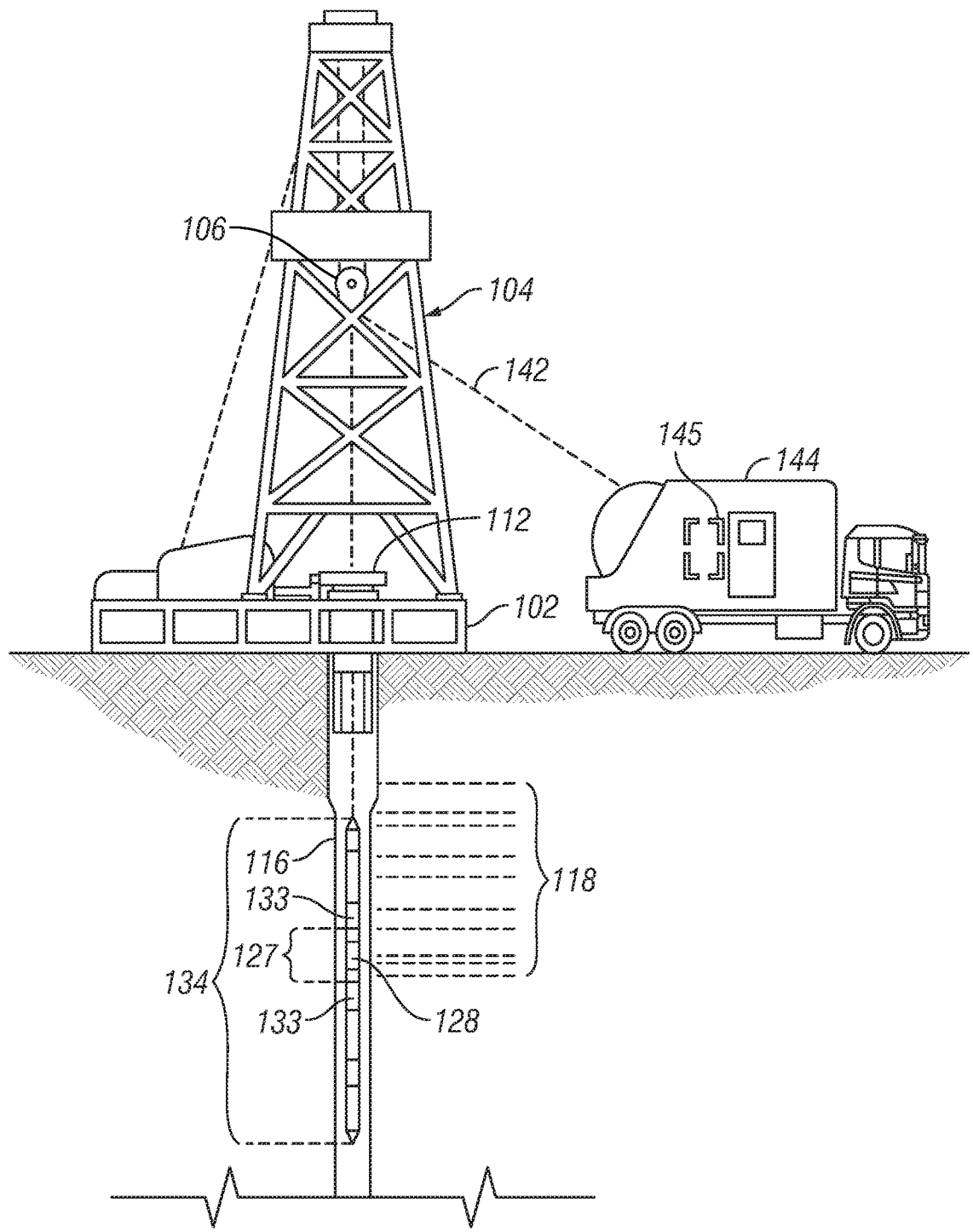
FIG. 2 shows a schematic view of a wireline logging environment in which the acoustic logging tool of FIG. 1. may be used, according to one or more embodiments.

FIG. 2 shows a schematic view of a wireline logging environment in which the acoustic logging tool 128, in accordance with one or more embodiments described in the present disclosure, may be used. As shown, logging operations can be conducted using a wireline logging string 134, e.g., a wireline logging sonde, suspended by a cable 142 that communicates power to the logging string 134 and telemetry signals between the logging string 134 and the surface. The logging string 134 includes the downhole tool 127, which can include a device for measuring formation resistivity, a gamma ray device for measuring formation gamma ray intensity, devices for measuring the inclination and azimuth of the tool string 108, pressure sensors for measuring drilling fluid pressure, temperature sensors for measuring wellbore temperature, etc. The downhole tool 127 can also include the acoustic logging tool 128 to measure the standoff and produce an image of the wellbore 116 as further described herein.

The downhole tool 127 may be coupled to other modules of the wireline logging string 134 by one or more adaptors 133. The surface control unit 144 collects measurements from the logging string 134, and includes the computer system 145 for processing and storing the measurements gathered by the sensors. The computer system 145 may also be capable of controlling the logging string 134 and downhole tool 127. The surface control unit 144 may further include a user interface (not shown) which displays the measurements, for example, a monitor or printer. Thus, it should be appreciated that the acoustic logging tool 128 may be used, in accordance with one or more embodiments, in various applications, such as wireline, slickline, coiled tubing, measurement-while-drilling, logging-while-drilling, etc.

Figure 3:
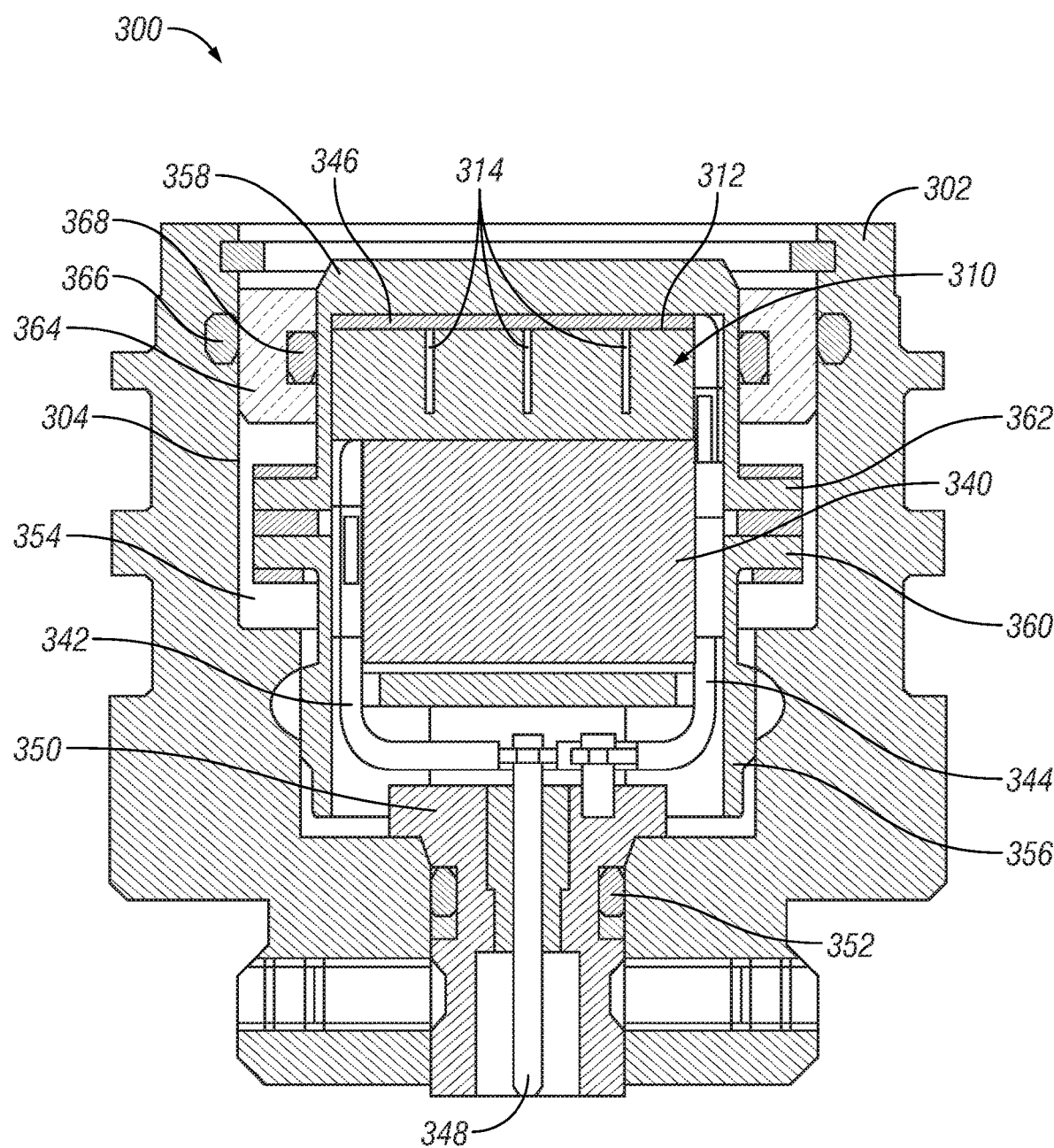
FIG. 3 shows a cross section view of an acoustic transducer, according to one or more embodiments.

FIG. 3 shows a cross section view of an acoustic transducer 300 that can be employed by the acoustic logging tool 128 of FIGS. 1 and 2, according to one or more embodiments. As shown, the acoustic transducer 300 comprises a body or housing 302, a piezoelectric material 310, and a backing material 340. The body 302 comprises an internal cavity 304 in which the piezoelectric material 310 and backing material 340 are located. The acoustic transducer 300 may be configured to perform under an operating pressure up to about 30 KSI (207 MPa) and an operating temperature up to about 150° C. (302° F.). As used herein, "about" refers to ±10% of a value when used to indicate that the value is an approximation.

The piezoelectric material 310 can include a piezoelectric crystal and/or a piezoelectric ceramic (e.g., lead zirconate titanate) operable to generate an ultrasonic acoustic wave and/or a signal indicative of a reflection of the wave. The piezoelectric material 310 comprises a piezo body 312 and grooves 314 formed on the piezo body 312 as further described herein with respect to FIGS. 4-7. The piezoelectric material 310 can have a charge constant of about $200 \times 10^{-12}$ m/V to about $600 \times 10^{-12}$ m/V and a quality factor of about 50 to about 200 to increase the amplitude of an acoustic wave transmitted and/or received by the piezoelectric material 310. With a charge constant and/or a quality factor within these levels, the piezoelectric material 310 can generate an acoustic pulse with an amplitude strong enough to measure the standoff of the wellbore in a dense fluid, such as a drilling fluid having a density of about 7 pounds per gallon (839 kg/m$^3$) to about 18 pounds per gallon (2157 kg/m$^3$). The grooves 314 formed on the piezo body 312 mitigate the effect of lateral mode acoustic wave propagating through the piezoelectric material 310 as further described herein.

The backing material 340 can be any material suitable to dampen or absorb acoustic waves emitting out of the back of the piezoelectric material 310. For example, the backing material 340 can include a mixture of tungsten powder and an elastomer or epoxy matrix. The backing material 340 may also be adhered to the piezoelectric material 310 using any suitable adhesive material, such as a flexible adhesive material.

The acoustic transducer 300 also includes electrical conductors 342 and 344 electrically coupled across opposite faces of the piezoelectric material 310. A conductive plate 346 is electrically engaged with the grooved face of the piezoelectric material 310 to provide an electrical contact across the grooved face for the electrical conductor 344. As an example, the conductive plate 346 can include a conductive mesh, such as a bronze mesh. The conductive plate 346 may be electrically engaged by adhering the conductive plate 346 to the piezoelectric material 310 using an electrically conductive epoxy. The electrical conductor 342 is coupled to a feedthrough element 348 to provide an electrical connection to a power source. The electrical conductor 344 is electrically coupled to an electrical connector 350 and the body 302 to establish a ground connection. An annular seal 352 is positioned between the body 302 and the electrical connector 350 to seal a compensation fluid 354 in the internal cavity 304 that provides a biasing element that expands and contracts with changes in the ambient pressure and temperature conditions. The compensation fluid 354 may be, for example, any suitable oil that increases in volume with increases in temperature.

The piezoelectric material 302 and backing material 340 are enclosed within a lower housing 356 and an upper housing 358 in the acoustic transducer 300. The housings 356 and 358 can be formed using any material suitable to perform under an operating pressure up to about 30 KSI (207 MPa) and an operating temperature up to about 150° C. (302° F.). For example, the housings 356 and 358 can be formed using polyether ether ketone (PEEK) or a similar thermoplastic or thermoset material. The piezoelectric material 310 and the backing material 340 are adhered to the upper housing 358 using a flexible adhesive material. The upper housing 358 is coupled to the lower housing 356 using fasteners (not shown) through flanges 360 and 362 of the housings 356 and 358, respectively.

A piston 364, exposed to the external wellbore fluid, is positioned in the internal cavity 304 between the upper housing 358 and the main body 302 to compensate for changes in ambient pressure and temperature. An outer annular seal 366 is positioned between the body 302 and the piston 364, and an inner annular seal 368 is positioned between the piston 364 and the upper housing 358. The annular seals 366 and 368 separate the compensation fluid 354 from the external wellbore fluid.

To allow the acoustic transducer 300 to respond to changes in ambient pressure and temperature conditions, the volume of the compensation fluid 354 within the internal cavity 304 of the body 302 expands and contracts with changes in the ambient pressure and temperature conditions. Upon increase in the compensation fluid 354 volume due to temperature, the piezoelectric material 310 and the backing material 340 act as a piston unit and move outward towards the wellbore annulus, thus allowing the compensation fluid volume to expand. If, however, the volume of the compensation fluid 354 is contracted due to an increase in hydrostatic pressure, the piston 364 and the piezoelectric material 310 move inwardly, away from the wellbore annulus, as a compensating piston to reduce the compensation fluid volume. Adequate amounts of electrical lead wire lengths and strain relief is provided to allow for movement of the piezoelectric material 310 for temperature/pressure compensation motion between the piezoelectric material 310 and the electrical connector 350.

FIGS. 4 and 5 show cross-section views of the piezoelectric material 310, in accordance with one or more embodiments. As shown in FIG. 4, the body 312 may be formed as a disc having a diameter 325 of about 0.3 inches (0.762 cm) to about 2.0 inches (5.10 cm) or greater, and preferably 0.750 inches (1.90 cm). The grooves 314 are formed on the body 312 of the piezoelectric material 310 to physically break the piezoelectric material 310 laterally and hence suppress lateral mode acoustic waves propagating through the piezoelectric material 310. The grooves 314 can include a first set of grooves 316-320 that intersect with a second set of grooves 322-326. The first set of grooves 316-320 can be formed on the body 312 to be parallel with each other and an x-axis 392, whereas the second set of grooves 322-326 can be formed on the body 312 to be parallel with each other and a y-axis 394. In other words, the second set of grooves 322-326 is not parallel with the first set of grooves 316-320. The second set of grooves 322-326 may also form oblique angles with the first set of grooves 316-320. In the following discussion, reference may be made to various directions or axes, such as an x-axis or direction 392, a y-axis or direction 394, and a z-axis or direction 396, as represented schematically on FIGS. 4 and 5. It should be appreciated that these axes are in relation to the orientation of the piezoelectric material 310 and not set axes.

As an example, the grooves 314 can include a first groove 318 that intersects a second groove 324 on the body 312. The first groove 318 may be formed on the body 312 to intersect perpendicularly or non-perpendicularly with the second groove 324. However, a preferred intersection angle is a perpendicular angle between the first groove 318 and the second groove 324. As shown in FIG. 5, the grooves 314 comprise a depth 328 of about 10% of the height 330 of the body 312 to about 99% of the height 330 of the body 312 to maintain the piezoelectric material 310 as an integral body 312. The grooves 314 can have any suitable depth 328 and thickness 332 to mitigate lateral mode acoustic waves propagating through the piezoelectric material 310.

Figure 6:
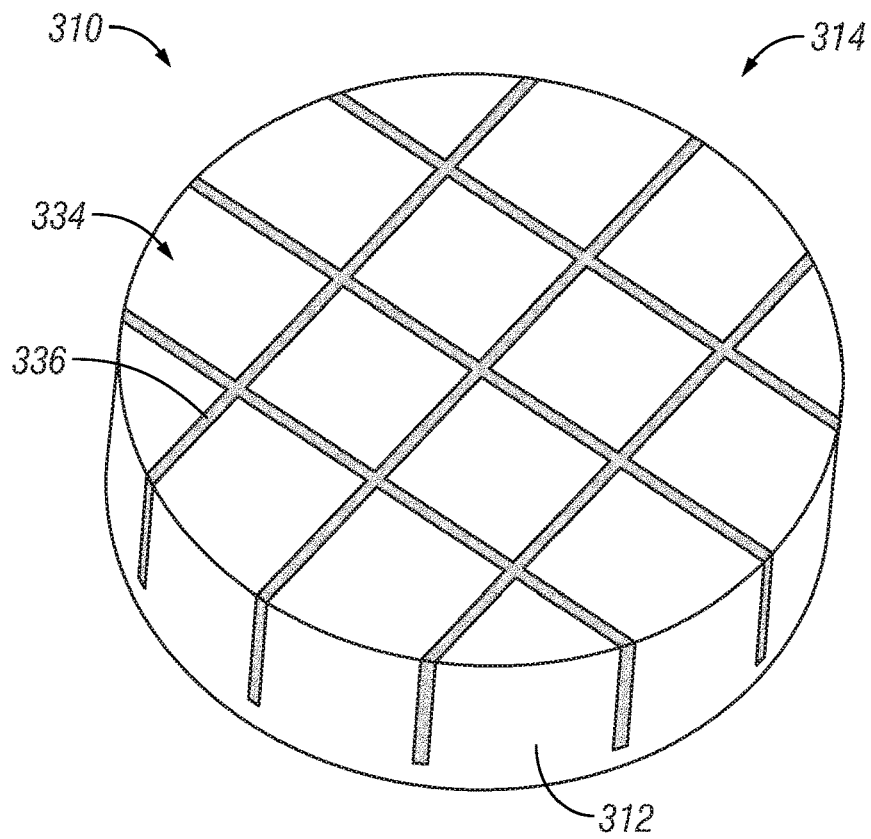
FIGS. 6 and 7 show axonometric views of the piezoelectric material of FIG. 3, in accordance with one or more embodiments.
Figure 7:
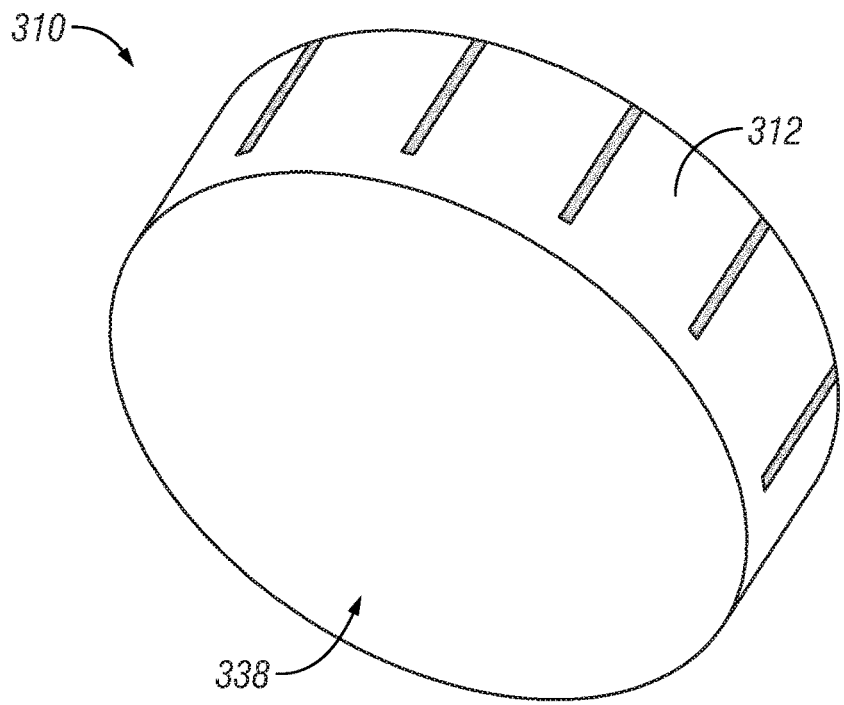

FIGS. 6 and 7 show axonometric views of the piezoelectric material 310, in accordance with one or more embodiments. As shown in FIG. 6, the grooves 314 are formed on an upper face 334 of the body 312 and can be at least partially filled with a potting compound 336, such as an epoxy, plastic, or silicone gel, where partially filled grooves 314 includes filling at least one groove with the potting compound 336 or the potting compound 336 not filled being to the entire depth of the grooves 314. As shown in FIG. 7, the grooves 314 are not formed on the lower face 338 to allow the piezoelectric material 310 to be a single integral body 312.

Figure 8:
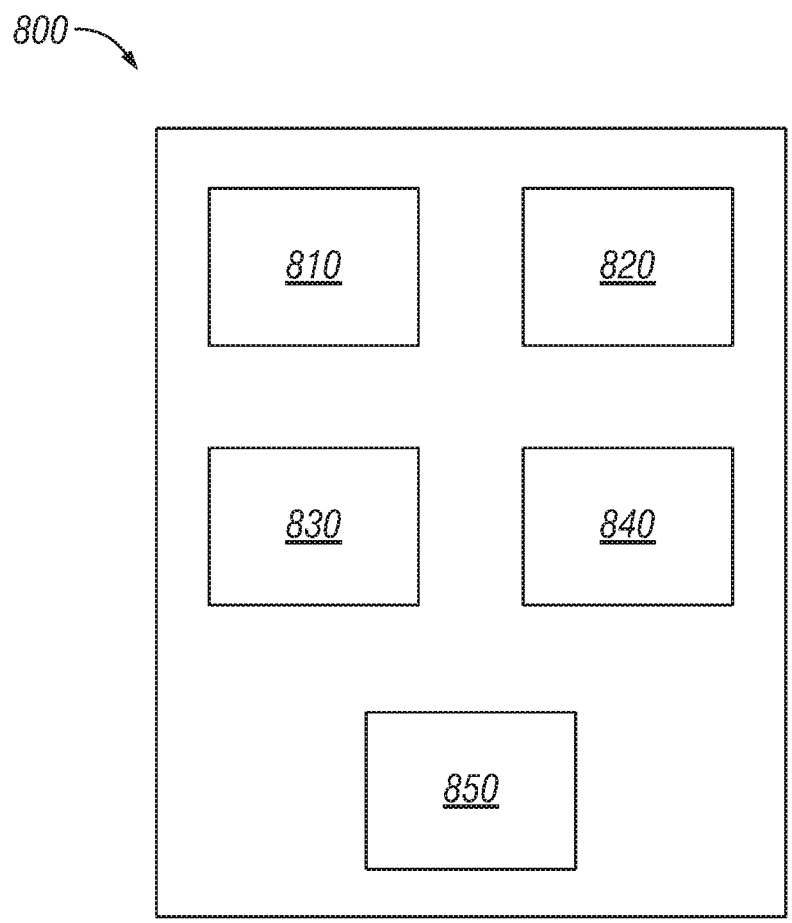
FIG. 8 shows a schematic view of an acoustic logging tool used for acoustic logging downhole, according to one or more embodiments.

FIG. 8 shows a schematic view of an acoustic logging tool 800 used for logging acoustic measurements downhole as described herein with respect to FIGS. 1 and 2, according to one or more embodiments. The acoustic logging tool 800 may comprise an acoustic transducer 810 (e.g., the transducer 300 of FIG. 3), a processor 820, an analog-to-digital converter 830, a storage device 840, and a telemetry system 850. The transducer 810 can be used as a transceiver to transmit acoustic pulses and also receive the pulses reflected from a wellbore wall. The pulsing or firing of the transducer 810 is controlled by the processor 820, which triggers the piezoelectric material 310 (FIG. 3) to emit an acoustic pulse. As used herein, the term processor is intended to include devices such as a field programmable gate array (FPGA). The acoustic pulse emitted from the transducer 810 passes through the drilling fluid to the wellbore wall, where the acoustic pulse reflects off the wellbore wall back to the transducer 810 as an echo for processing. The transducer 810 is responsive to the echo and generates a signal indicative of the echo, which is communicated to the analog-to-digital converter (A/D C) 830 to convert the signal into a digitized signal.

Figure 9:
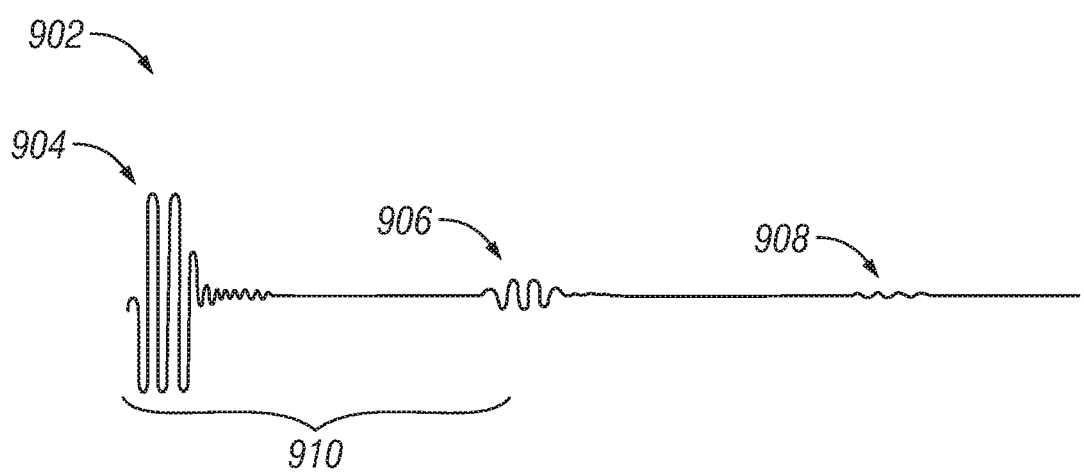
FIG. 9 shows a waveform view of a pulse-echo signal produced by the acoustic logging tool of FIG. 8.

As an example, FIG. 9 shows a waveform view of a pulse-echo signal 902 produced by the acoustic logging tool 800 of FIG. 8, in accordance with one or more embodiments. As shown, the amplitude of the signal 902 is depicted as a function of time. The signal 902 comprises an ultrasonic acoustic pulse 904, an echo 906, and a secondary echo 908. Based on the pulse-echo technique, the standoff from the wellbore wall can be determined by the equation:

$$\delta = \frac{v_f t}{2}$$

where δ is the standoff, $v_f$ is the acoustic velocity of the drilling fluid, and t (910) is the round-trip time of the acoustic wave (e.g., the time difference between the pulse 903 emission and the echo 906 arrival). When the transducer 810 is fired, the acoustic pulse 904 can ring down in the piezoelectric material 310 (FIG. 3) producing ring-down noise that interferes with the echo 906, which can also produce ring-down noise that interferes with the secondary echo 908. The piezoelectric material 310 includes the grooves 314 to physically break the piezoelectric material 310 laterally, and thus, mitigate lateral mode waves and ring-down noise in the piezoelectric material 310 based on at least one of the number, spacing, depth, and intersection angle of the grooves 314.

The piezoelectric material 310 is also configured to have a charge constant and/or a quality factor suitable to increase the amplitude of the acoustic pulse 904 emitted from the transducer 810 and/or the echo 906 received by the transducer 810. For example, with a charge constant of about $450 \times 10^{-12}$ m/V and/or a quality factor of about 95, the piezoelectric material 310 may transmit a stronger pulse to travel through drilling fluid having a density from about 7 pounds per gallon (839 kg/m$^3$) to about 18 pounds per gallon (2157 kg/m$^3$) and be responsive to generate a signal indicative of the echo reflected from a wall. The increased amplitude of the signal 902 with reduced ring-down noise can improve the signal-to-noise ratio of the received signal (e.g., the echo 906). An improved signal-to-noise ratio allows for improved identification of the echo (e.g., the echo 906) from noise in the echo waveform. The increased signal amplitude can also increase the measureable standoff of the transducer 810 as the echo 906 is able to travel a farther distance before signal attenuation reduces the echo amplitude beyond detectable levels. For example, the transducer 810 may be able to measure a standoff of about 6 inches (15 cm) in a drilling fluid having a density of about 8 pounds per gallon (959 kg/m$^3$).

Referring to FIG. 8, the processor 820 is configured to determine an acoustic parameter based on the signal (e.g., the signal 902) generated by the transducer 810, where the acoustic parameter can include at least one of an acoustic velocity, acoustic impedance (e.g., the acoustic impedance of the casing in the wellbore), round-trip time, and a standoff from the wellbore wall. The digitized signal can be stored in a storage device 840 for further processing at the earth's surface, and if desired, may be used as inputs to a telemetry system 850 for transmitting real time data to the earth's surface for processing by the surface control unit 144 of FIGS. 1 and 2. The storage device 840 may include a non-transitory storage medium to electronically store the signals generated by the transducer 810. The control and processing of the transducer 810 is performed with the use of a computer program stored on the storage device 840. The non-transitory storage medium may include ROM, EPROM, EEPROM, flash memory, RAM, a hard drive, a solid state disk, an optical disk, or a combination thereof.

In addition to the embodiments described above, many examples of specific combinations are within the scope of the disclosure, some of which are detailed below:

Example 1

An acoustic transducer, comprising a piezoelectric material comprising:
 a body; and
 grooves formed on the body, wherein the grooves comprise a first groove that intersects with a second groove on the body.

Example 2

The acoustic transducer of example 1, wherein the first groove is formed on the body to intersect perpendicularly with the second groove.

Example 3

The acoustic transducer of example 1, wherein the grooves further comprise a first set of grooves parallel with each other, and a second set of grooves not parallel with the first set of grooves.

Example 4

The acoustic transducer of example 1, wherein the piezoelectric material comprises a charge constant of $200 \times 10^{-12}$ m/V to $600 \times 10^{-12}$ m/V and a quality factor of 50 to 200.

Example 5

The acoustic transducer of example 1, further comprising a potting compound in at least one of the grooves.

Example 6

The acoustic transducer of example 1, wherein the grooves comprise a depth of 10% of the height of the body to 99% of the height of the body.

Example 7

The acoustic transducer of example 1, wherein the grooves are formed on a face of the body.

Example 8

The acoustic transducer of example 1, the piezoelectric material is operable to generate an ultrasonic acoustic wave.

Example 9

The acoustic transducer of example 1, wherein the grooves are configured to mitigate a lateral mode acoustic wave propagating through the piezoelectric material based on at least one of the number, spacing, depth, and intersection angle of the grooves.

Example 10

A method of acoustic logging a wall, comprising:
 transmitting an acoustic pulse at the wall using an acoustic transducer, wherein the acoustic transducer comprises a piezoelectric material comprising a body and grooves formed on the body, the grooves comprising a first groove that intersects with a second groove;
 generating a signal indicative of a reflection of the pulse using the acoustic transducer; and determining an acoustic parameter based on the signal using a processor.

Example 11

The method of example 10, further comprising positioning the acoustic transducer in a wellbore intersecting a subterranean earth formation.

Example 12

The method of example 11, wherein transmitting comprises transmitting the acoustic pulse through a fluid having a density of 7 pounds per gallon (839 kg/m$^3$) to 18 pounds per gallon (2157 kg/m$^3$).

Example 13

The method of example 10, wherein transmitting comprises mitigating a lateral mode acoustic wave propagating through the piezoelectric material based on at least one of the number, spacing, depth, and intersection angle of the grooves.

Example 14

The method of example 10, wherein the acoustic parameter includes at least one of an acoustic velocity, acoustic impedance, round-trip time, and a standoff.

Example 15

An acoustic logging tool locatable in a wellbore intersecting a subterranean earth formation, comprising:
   an acoustic transducer comprising:
      a piezoelectric material comprising a body and grooves formed on the body, wherein the grooves comprise a first groove that intersects with a second groove on the body; and
   a processor configured to determine an acoustic parameter based on a signal generated by the acoustic transducer, the signal being indicative of the acoustic wave.

Example 16

The acoustic logging tool of example 15, wherein the grooves further comprise a first set of grooves parallel with each other; and a second set of grooves not parallel with the first set of grooves.

Example 17

The acoustic logging tool of example 15, wherein the acoustic parameter includes at least one of an acoustic velocity, acoustic impedance, round-trip time, and a standoff.

Example 18

The acoustic logging tool of example 15, wherein the acoustic transducer further comprises a potting compound in at least one of the grooves.

Example 19

The acoustic logging tool of example 15, wherein the grooves comprise a depth of 10% of the height of the body to 99% of the height of the body.

Example 20

The acoustic logging tool of example 15, wherein the grooves are configured to mitigate a lateral mode acoustic wave propagating through the piezoelectric material based on at least one of the number, spacing, depth, and intersection angle of the grooves.

This discussion is directed to various embodiments. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present disclosure has been described with respect to specific details, it is not intended that such details should be regarded as limitations on the scope of the disclosure, except to the extent that they are included in the accompanying claims.

What is claimed is:
1. An acoustic transducer, comprising a piezoelectric material comprising:

an integral piezo body with a front face and a back face, wherein the back face is configured for establishing a ground connection;

grooves formed on the front face of the piezo body with a depth of at least two thirds of a height of the piezo body, wherein the grooves comprise a first groove that intersects with a second groove on the piezo body; and a conductive plate attached across the front face of the piezo body to provide an electrical contact across the front face such that the entire front face may receive power through the conductive plate.

2. The acoustic transducer of claim 1, wherein the first groove is formed on the piezo body to intersect perpendicularly with the second groove.

3. The acoustic transducer of claim 1, wherein the grooves further comprise a first set of grooves parallel with each other, and a second set of grooves not parallel with the first set of grooves.

4. The acoustic transducer of claim 1, wherein the piezoelectric material comprises a charge constant of $200 \times 10^{-12}$ m/V to $600 \times 10^{-12}$ m/V and a quality factor of 50 to 200.

5. The acoustic transducer of claim 1, further comprising a potting compound in at least one of the grooves.

6. The acoustic transducer of claim 1, wherein the grooves comprise a depth of up to 99% of the height of the piezo body.

7. The acoustic transducer of claim 1, the piezoelectric material is operable to generate an ultrasonic acoustic wave.

8. The acoustic transducer of claim 1, wherein the grooves are configured to mitigate a lateral mode acoustic wave propagating through the piezoelectric material based on at least one of the number, spacing, depth, and intersection angle of the grooves.

9. The acoustic transducer of claim 1, wherein the conductive plate comprises wire mesh.

10. A method of acoustic logging a wall, comprising:
transmitting an acoustic pulse at the wall using an acoustic transducer, wherein the acoustic transducer comprises a piezoelectric material comprising an integral piezo body with a front face and a back face, wherein the back face is configured for establishing a ground connection, the piezo body further comprising grooves formed on the front face of the piezo body with a depth of at least two thirds of a height of the piezo body and wherein the grooves comprise a first groove that intersects with a second groove, and a conductive plate attached across the front face of the piezo body to provide an electrical contact across the front face such that the entire front face may receive power through the conductive plate;
generating a signal indicative of a reflection of the pulse using the acoustic transducer; and
determining an acoustic parameter based on the signal using a processor.

11. The method of claim 10, further comprising positioning the acoustic transducer in a wellbore intersecting a subterranean earth formation.

12. The method of claim 11, wherein transmitting comprises transmitting the acoustic pulse through a fluid having a density of 7 pounds per gallon (839 kg/m$^3$) to 18 pounds per gallon (2157 kg/m$^3$).

13. The method of claim 10, wherein transmitting comprises mitigating a lateral mode acoustic wave propagating through the piezoelectric material based on at least one of the number, spacing, depth, and intersection angle of the grooves.

14. The method of claim 10, wherein the acoustic parameter includes at least one of an acoustic velocity, acoustic impedance, round-trip time, and a standoff.

15. An acoustic logging tool locatable in a wellbore intersecting a subterranean earth formation, comprising:
an acoustic transducer comprising:
a piezoelectric material comprising an integral piezo body with a front face and a back face, wherein the back face is configured for establishing a ground connection, the piezo body further comprising grooves formed on the front face of the piezo body with a depth of at least two thirds of a height of the piezo body and wherein the grooves comprise a first groove that intersects with a second groove on the piezo body, and a conductive plate attached across the front face of the piezo body to provide an electrical contact across the front face such that the entire front face may receive power through the conductive plate; and
a processor configured to determine an acoustic parameter based on a signal generated by the acoustic transducer, the signal being indicative of the acoustic wave.

16. The acoustic logging tool of claim 15, wherein the grooves further comprise a first set of grooves parallel with each other; and a second set of grooves not parallel with the first set of grooves.

17. The acoustic logging tool of claim 15, wherein the acoustic parameter includes at least one of an acoustic velocity, acoustic impedance, round-trip time, and a standoff.

18. The acoustic logging tool of claim 15, wherein the acoustic transducer further comprises a potting compound in at least one of the grooves.

19. The acoustic logging tool of claim 15, wherein the grooves comprise a depth of up to 99% of the height of the piezo body.

20. The acoustic logging tool of claim 15, wherein the grooves are configured to mitigate a lateral mode acoustic wave propagating through the piezoelectric material based on at least one of the number, spacing, depth, and intersection angle of the grooves.

* * * * *